United States Patent
Koenig et al.

(10) Patent No.: US 10,637,952 B1
(45) Date of Patent: Apr. 28, 2020

(54) TRANSITION ARCHITECTURE FROM MONOLITHIC SYSTEMS TO MICROSERVICE-BASED SYSTEMS

(71) Applicant: SAP SE, Walldorf (DE)

(72) Inventors: Steffen Koenig, Heidelberg (DE); Andreas Jahr, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/224,888

(22) Filed: Dec. 19, 2018

(51) Int. Cl.
*H04L 29/08* (2006.01)

(52) U.S. Cl.
CPC ...... *H04L 67/2823* (2013.01); *H04L 67/1031* (2013.01); *H04L 67/1034* (2013.01); *H04L 67/16* (2013.01); *H04L 67/2809* (2013.01)

(58) Field of Classification Search
CPC .......... H04L 67/2823; H04L 67/1031; H04L 67/1034; H04L 67/16; H04L 67/2809
See application file for complete search history.

(56) References Cited

U.S. PATENT DOCUMENTS

| | | | |
|---|---|---|---|
| 6,775,657 B1 | 8/2004 | Baker | |
| 6,827,578 B2 | 12/2004 | Krebs et al. | |
| 6,839,850 B1 | 1/2005 | Campbell et al. | |
| 7,181,768 B1 | 2/2007 | Ghosh et al. | |
| 7,313,618 B2 | 12/2007 | Braemer et al. | |
| 7,844,829 B2 | 11/2010 | Meenakshisundaram | |
| 8,392,908 B2 | 3/2013 | Laicher et al. | |
| 8,644,755 B2 | 2/2014 | Krebs et al. | |
| 8,671,392 B2 | 3/2014 | Jahr et al. | |
| 9,026,502 B2 | 5/2015 | Driesen et al. | |
| 9,183,123 B2 | 11/2015 | Spektor et al. | |
| 9,189,226 B2 | 11/2015 | Driesen et al. | |
| 9,195,453 B1 | 11/2015 | Giammaria et al. | |
| 9,276,825 B2 | 3/2016 | Misovski et al. | |
| 9,336,060 B2 | 5/2016 | Nori et al. | |
| 9,489,647 B2 | 11/2016 | Martinez et al. | |

(Continued)

OTHER PUBLICATIONS

U.S. Appl. No. 15/665,700, filed Aug. 1, 2017, Rouven Krebs, dated Feb. 7, 2019.

(Continued)

*Primary Examiner* — Wing F Chan
*Assistant Examiner* — Billy H Ng
(74) *Attorney, Agent, or Firm* — Fish & Richardson P.C.

(57) ABSTRACT

Methods, systems, and computer-readable storage media for providing a transition service broker, the transition service broker including a service registry proxy, and a service registry, the service proxy registry registering service proxies, each service proxy enabling interaction between at least one core component of a legacy core, and one or more external services, the service registry registering services available for consumption by core components of the legacy core, each external service of the external services including a service facade that maps between a legacy architecture, and the service, during a transition period between the legacy architecture, and the microservices-based architecture: establishing a connection between the at least one core component, and an external service through a service proxy, and receiving input from the external service through the connection, the input being processed by the at least one core component during execution of the software product in the legacy architecture.

20 Claims, 6 Drawing Sheets

(56) References Cited

U.S. PATENT DOCUMENTS

| | | |
|---|---|---|
| 9,639,448 B2 | 5/2017 | Gebhard et al. |
| 9,678,740 B2 | 6/2017 | Heine et al. |
| 9,722,890 B2 | 8/2017 | Jahr et al. |
| 2003/0151629 A1 | 8/2003 | Krebs et al. |
| 2003/0152899 A1 | 8/2003 | Krebs et al. |
| 2003/0152900 A1 | 8/2003 | Krebs et al. |
| 2003/0154176 A1 | 8/2003 | Krebs et al. |
| 2003/0188189 A1 | 10/2003 | Desai et al. |
| 2004/0117658 A1 | 6/2004 | Klaes |
| 2007/0073519 A1 | 3/2007 | Long |
| 2009/0248473 A1 | 10/2009 | Doenig et al. |
| 2010/0094886 A1 | 4/2010 | Krebs |
| 2010/0212013 A1 | 8/2010 | Kim et al. |
| 2013/0159427 A1 | 6/2013 | Jahr et al. |
| 2013/0191820 A1 | 7/2013 | Jahr et al. |
| 2014/0379669 A1 | 12/2014 | Driesen et al. |
| 2014/0380265 A1 | 12/2014 | Driesen et al. |
| 2015/0033322 A1 | 1/2015 | Wang et al. |
| 2015/0100684 A1 | 4/2015 | Maes et al. |
| 2015/0237067 A1 | 8/2015 | Talyansky |
| 2015/0295844 A1 | 10/2015 | Perreira et al. |
| 2016/0226992 A1 | 8/2016 | Akcin |
| 2016/0241444 A1 | 8/2016 | Maes |
| 2017/0061348 A1 | 3/2017 | Mack et al. |
| 2017/0109137 A1 | 4/2017 | Subramanian et al. |
| 2017/0109536 A1 | 4/2017 | Stopel et al. |
| 2017/0115976 A1 | 4/2017 | Mills |
| 2017/0169217 A1 | 6/2017 | Rahaman et al. |
| 2017/0187785 A1 * | 6/2017 | Johnson ............... H04L 67/10 |
| 2020/0019388 A1 * | 1/2020 | Jaeger ............... G06F 9/5055 |

OTHER PUBLICATIONS

U.S. Appl. No. 15/665,758, filed Aug. 1, 2017, Rouven Krebs, dated Feb. 7, 2019.

U.S. Appl. No. 15/673,691, filed Aug. 10, 2017, Krebs et al., dated Feb. 14, 2019.

U.S. Appl. No. 15/812,248, filed Nov. 14, 2017, Jahr, Andreas, dated May 16, 2019.

U.S. Appl. No. 16/011,751, filed Jun. 19, 2018, Hoke et al., dated Dec. 19, 2019.

* cited by examiner

TRANSITION ARCHITECTURE FROM MONOLITHIC SYSTEMS TO MICROSERVICE-BASED SYSTEMS

BACKGROUND

As software architectures are modernized, legacy systems become outdated. For example, legacy applications have been provided as monolithic applications executing on an application server. Such applications can include millions of lines of code distributed over hundreds of development components. Each application executes on a server system (e.g., an application server), which server systems can also become outdated. Microservice-based architectures have been introduced, which provide advantages over traditional software architectures. For example, microservice-based architectures enable continuous enhancement of functionality without re-implementation, and parallel code lines that traditional architectures may require.

SUMMARY

Implementations of the present disclosure are directed to transition from a legacy application architecture to a microservices-based application architecture. More particularly, implementations of the present disclosure are directed to a transition platform that enables transition from a legacy application architecture to a microservices-based application architecture.

In some implementations, actions include providing, within a legacy system of the legacy architecture, a transition service broker, the transition service broker including a service registry proxy, and a service registry, the service proxy registry registering service proxies, each service proxy enabling interaction between at least one core component of a legacy core, and one or more external services, the service registry registering services available for consumption by core components of the legacy core, each external service of the one or more external services including a service facade that maps between the legacy architecture, and the service, during a transition period between the legacy architecture, and the microservices-based architecture: establishing a connection between the at least one core component, and an external service through a service proxy, and receiving input from the external service through the connection, the input being processed by the at least one core component during execution of the software product in the legacy architecture. Other implementations of this aspect include corresponding systems, apparatus, and computer programs, configured to perform the actions of the methods, encoded on computer storage devices.

These and other implementations can each optionally include one or more of the following features: the transition service broker includes a package isolation manager that assigns an existing package to a service as an assigned package, and changes a visibility of the assigned package to restrict access to the assigned package to an interface of the service; the service broker includes a state recovery manager that is configured to delete a service instance that is existing and includes a state, and is further configured to restart the service instance, and determine whether the state was fully recovered after restart; the transition service broker comprises a facade for communication between core components of the legacy core, and the service proxy registry; the service proxy registry provides a lookup mechanism for service proxies that provide a protocol-independent, callable interface to external services; the transition service broker registers, monitors and integrates the external services for consumption by the legacy core during the transition, and registers one or more components as services to be consumed by one or more other core components during the transition; and the service registry periodically performs status checks on registered services, and stores status of the registered services.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
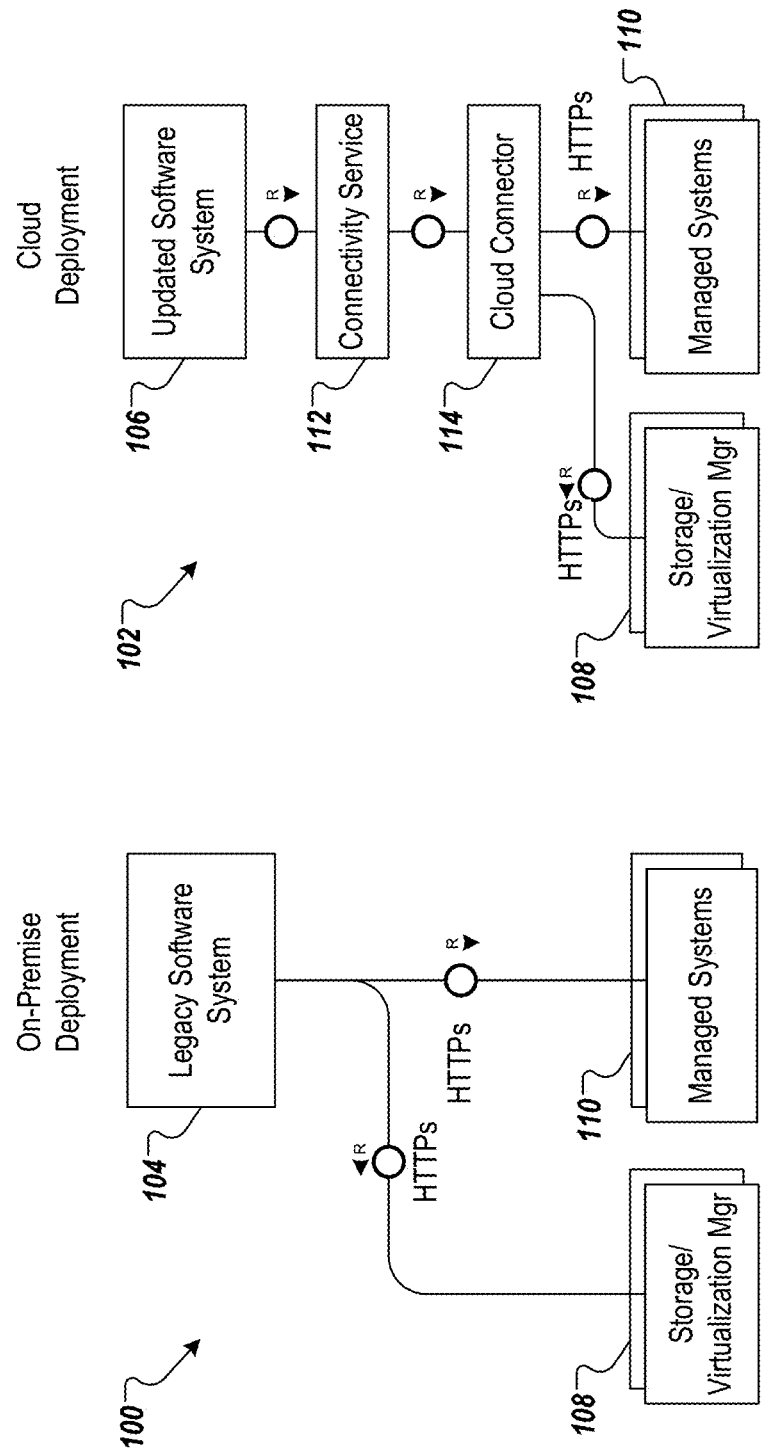
FIG. 1 depicts example architectures of respective software systems in accordance with implementations of the present disclosure.

Implementations of the present disclosure are directed to transition from a legacy application architecture to a microservices-based application architecture. More particularly, implementations of the present disclosure are directed to a transition platform that enables transition from a legacy application architecture to a microservices-based application architecture. Implementations can include actions of providing, within a legacy system of the legacy architecture, a transition service broker, the transition service broker including a service registry proxy, and a service registry, the service proxy registry registering service proxies, each service proxy enabling interaction between at least one core component of a legacy core, and one or more external services, the service registry registering services available for consumption by core components of the legacy core, each external service of the one or more external services including a service facade that maps between the legacy architecture, and the service, during a transition period between the legacy architecture, and the microservices-based architecture: establishing a connection between the at least one core component, and an external service through a service proxy, and receiving input from the external service through the connection, the input being processed by the at least one core component during execution of the software product in the legacy architecture.

Implementations of the present disclosure are described in further detail herein with reference to an example software system. The example software system includes a landscape management software system. An example landscape management software system includes SAP Landscape Management (LaMa) provided by SAP SE of Walldorf, Germany. It is contemplated, however, that implementations of the present disclosure can be realized with any appropriate software system, and are not limited to landscape management.

To provide further context for implementations of the present disclosure, landscape management systems enable administrators to simplify and automate the tasks for operating system landscapes. Example landscape management and life-cycle operations can include, without limitation, safe and reliable start/stop of systems, relocation of systems (or instances) from one host to another host, efficient mass operations on a complete landscape or parts of a landscape, constant validation of landscapes, system copy/cloning/provisioning, automated capacity management, operations on chains of dependent systems, and additional reporting, monitoring and visualization capabilities.

To implement these operations, landscape management systems leverage and integrate with infrastructure components and services. These can include, for example, platform and storage virtualization, network management, and central user management. Landscape systems can leverage tools, components, and services for the automation of specific tasks (e.g., installation of application servers, renaming of a system).

Traditionally, landscape management systems (like many other types of software systems) are provided as a monolithic application executing on a server system. With particular reference to SAP LaMa, LaMa is provided as a Java application (e.g., including almost 1 million lines of code distributed over approximately 100 development components) running as an on-premise deployment on a proven (but aging) SAP NetWeaver Application Server (AS) Java stack, which employs volume-based licensing schemes, and a non-continuous delivery model.

However, and as introduced above, virtualization, cloud computing, (micro)service-based architectures, and continuous delivery models are changing the way software is deployed, run, and maintained. Deployment of services and how services are consumed are also evolving. For example, in the age of cloud computing, it no longer matters whether a service is consumed remotely, or locally. Enterprises embrace this digital transformation by migrating into the cloud, or by transforming into hybrid architectures, which leverage on-premise and cloud services at the same time. Accordingly, legacy software systems, such as the example landscape management systems, must embrace this transformation by adapting new development principles, technology, and licensing models to be able to fulfil evolving customer requirements.

In view of this, implementations of the present disclosure provide for transition of software system architectures to a modernized architecture that is modular, scalable, maintainable, and capable of supporting cloud and hybrid deployment models. Further, and as described herein, implementations of the present disclosure provide support for traditional, on-premise systems, prepare platform switch and architectural change of software systems by componentization and removal of specific dependencies, and enable a functional and well-integrated product experience during the transition.

In accordance with implementations of the present disclosure, existing functionality of a legacy software system (e.g., on-premise application) is refactored as one or more platform-independent microservices. In some examples, such microservices can executed on a cloud platform, and/or an application server (e.g., CP CF, AS-Java). Any new functionality is developed and built as platform-independent microservices can executed on a cloud platform, and/or an application server (e.g., CP CF, AS-Java). In some implementations, a software system based on a prephase application server (e.g., prephase AS Java-based LaMa) can be provided in an enterprise cloud (e.g., HANA Enterprise Cloud (HEC) provided by SAP SE). In some implementations, on-premise and cloud-based software system instances can scale out by additional microservice instances. In some examples, at least a portion of the microservices (new or refactored) will only be available in the cloud, and not be offered for on-premise consumption. An on-premise version of the software system (e.g., LaMa version >3.0) will be sunset, and a microservices-based software system (e.g., LaMa Next Generation (LaMaNG)) will be launched.

FIG. 1 depicts example architectures 100, 102 of respective software systems 104, 106 in accordance with implementations of the present disclosure. In some examples, the software system 104 represents a legacy software system (e.g., a monolithic, on-premise landscape management system), and the software system 106 represents an updated software system (e.g., a cloud-based landscape management system). As depicted in the example of FIG. 1, the example architecture 100 includes the software system 104 having direct connections (e.g., Hyper Text Transfer Protocol Secure (HTTPS)) to one or more storage/virtualization managers 108, and one or more managed systems 110 (e.g., in the example case of landscape management).

As depicted in the example of FIG. 1, the example architecture 102 includes the software system 106 having indirect connections to the one or more storage/virtualization managers 108, and the one or more managed systems 110 (e.g., in the example case of landscape management). For example, the software system 106 communicates with the one or more storage/virtualization managers 108, and the one or more managed systems 110 through a connectivity service 112, and a cloud connector 114.

As introduced above, implementations of the present disclosure enable transition of legacy software systems, such as the legacy software system 104 of FIG. 1, to updated (next generation (NG)) software systems, such as the updated software system 106. In some implementations, and to support legacy users, the legacy software system 106 can continue to be provisioned. Using SAP LaMa as a non-limiting example, the legacy software system 104 can be provided as an on-premise LaMaNG variant (e.g., LaMaNG oP Edition) that is shipped as a classical on-premise installation running on XSA (HANA). Again using SAP LaMa as a non-limiting example, the updated software system 106 can be provided as a cloud LaMaNG variant (e.g., LaMaNG Cloud Edition) that is executed on SAP Cloud Platform (CP) Cloud Foundry (CF). Although not depicted in FIG. 1, a third architecture can include a hybrid approach, where a LaMaNG oP Edition consumes LaMa cloud services as optional product feature extensions.

As described in further detail herein, building blocks of the target architecture can be provided as self-contained components for complex functionality, or microservices that encapsulate a distinct set of functions.

Figure 2:
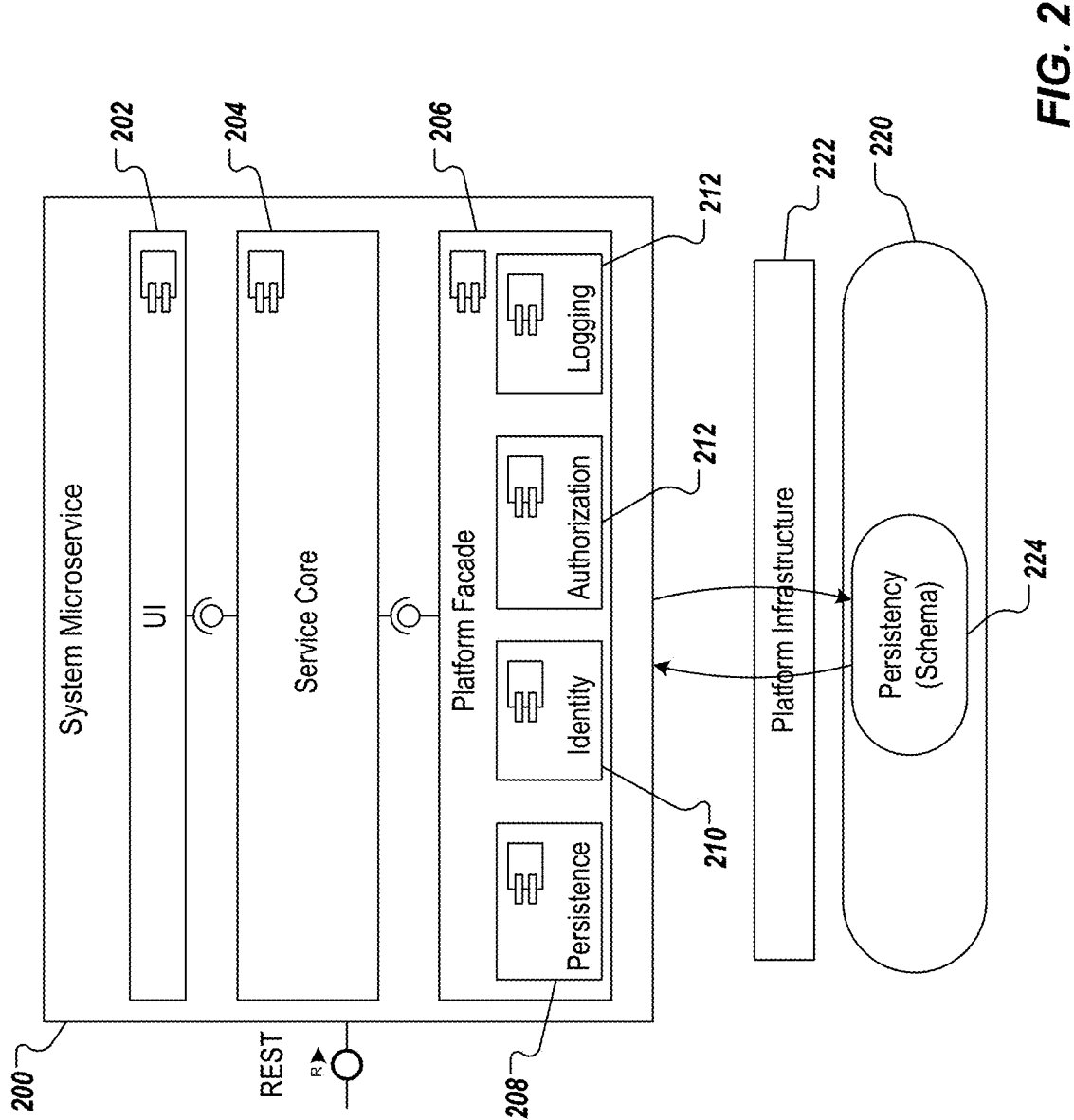
FIG. 2 depicts example microservice components in accordance with implementations of the present disclosure.

FIG. 2 depicts example microservice components in accordance with implementations of the present disclosure. More particularly, a microservice 200 is depicted, and includes a user interface (UI) 202, a service core 204, and a platform facade 206. In the depicted example, the platform facade 206 include a persistence module 208, an identity module 210, and authorization module 212, and a logging module 214. In some implementations, the microservice 200 can be described as a self-contained, independently executable entity that implements software system functionality (e.g., landscape management functionality) that is provided through a well-defined REST interface.

In some implementations, the service core 204 is independent of any specific runtime (e.g., is runtime agnostic). In some examples, the platform facade 206 abstracts runtime, and platform specifics from the service core 204. In some examples, the microservice 200 interacts with a persistency layer 220 through a platform infrastructure 222 to store state data. In some examples, data is stored in a tenant-specific database schema 224. In some examples, a non-oData REST interface is provided to enable interaction between the microservice 200, and the persistency layer 220.

In some implementations, components and services can be grouped into core components that provide mandatory core, and backend functionality, and feature services that provide specialized product functionality beyond basic features.

Continuing with the example of LaMa, example core services can include, without limitation, a LaMa authorization service (LAS), a LaMa landscape model service (LMS), a LaMa monitoring service (MOS), a LaMa process service (LPS), and a LaMa validation service (LVS). In some examples, the LAS provides user authorization and role management services. In some examples, the LMS provides an extensible landscape model that is used for operations and monitoring. In some examples, the landscape model can be expanded to reflect different types of infrastructure topologies (e.g., multi-tenancy support, HA capable, scalable). In some examples, the MOS provides scalable and extendable landscape monitoring services. Monitoring endpoints are pluggable and support multiple types of infrastructures, virtualizations, and applications. In some examples, the LPS is a workflow engine that executes complex operations on the landscape model. In some examples, a declarative workflow modelling approach (e.g., business process modeling notation (BPMN)) is implemented. In some examples, the LVS is a validation engine to validate and ensure required landscape model state for landscape operations.

Continuing with the example of LaMa, example feature services can include, without limitation, a LaMa container management service (CMS), and a LaMa storage service (LSS). In some examples, the CMS provides a domain model, and operations that are specific to an implemented container management system (e.g., Kubernetes provided by the Linux Foundation). In some examples, the LSS provides storage (e.g., cloud storage) management services used for copy/refresh scenarios.

As described in further detail herein, implementations of the present disclosure use facades, which include service facades, and registry facades. In some examples, the service facade provides the adaptation of a core of a service to the actual runtime environment that calls the service. In some examples, a current environment, and a target environment may have different ways (e.g., application programming interfaces (APIs)) of how log message have to provide, how monitoring metrics are exposed, how authorization requests need to be handled. In general, each the service facade includes all of the environment-specific calls from/to the environment, and provides a mapping of the environment-independent (micro)service core to the environment specific APIs, and data formats.

In further detail, implementations of the present disclosure include a first facade for the current environment (e.g., AS Java), and a second facade for the target environment (e.g., CF). In some examples, the first facade is only loaded and executed in the AS Java environment of the microservice. If, during the transition period, the microservice is already tested in its target environment (CF), the microservice core must be packaged with the second facade of the service, and then executed in CF. After the target environment becomes the actual environment (and the only one, since the actual environment is retired), the target facade can be merged with the microservice core.

Figure 3:
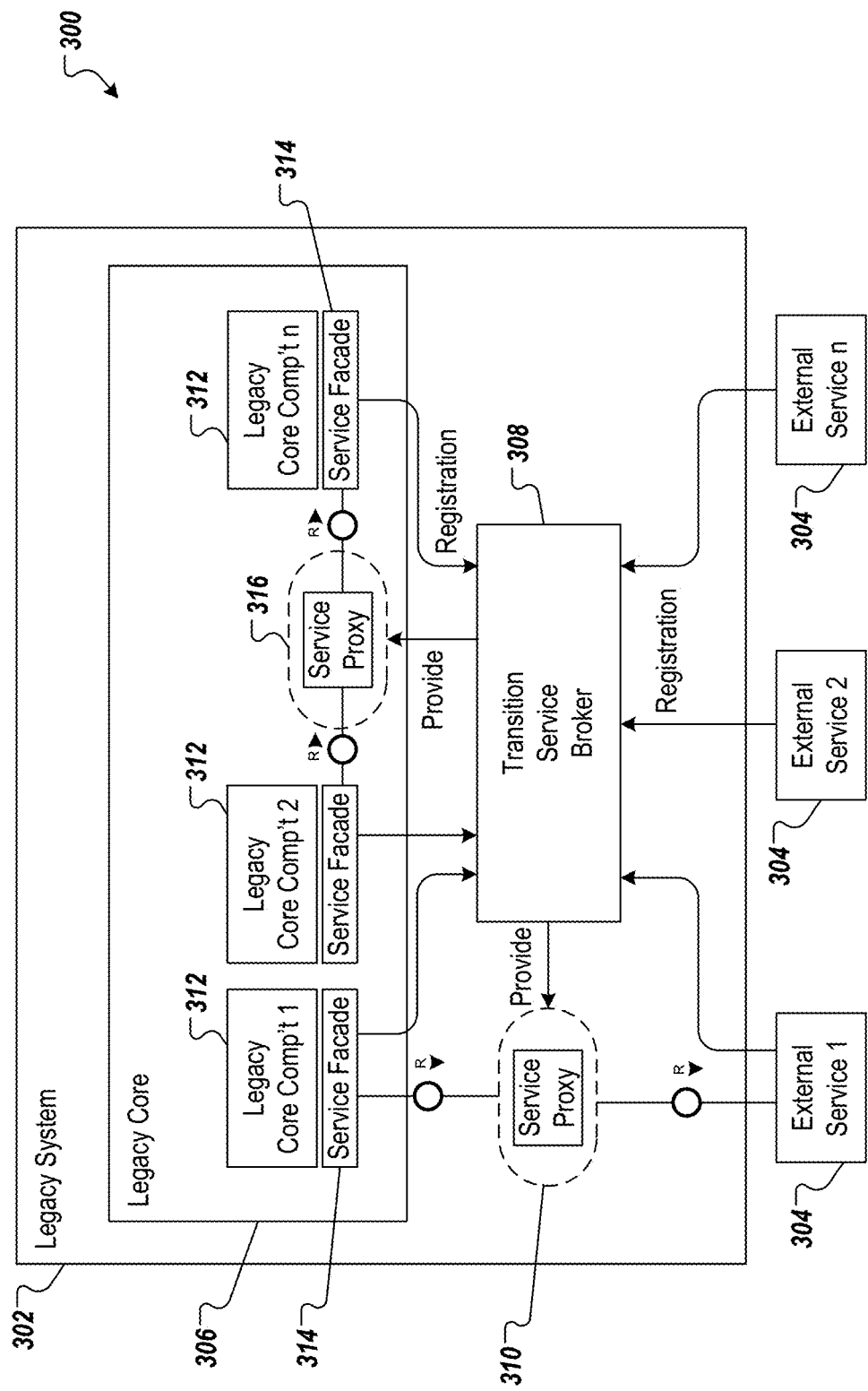
FIG. 3 depicts an example microservice anatomy in accordance with implementations of the present disclosure.

FIG. 3 depicts an example transition architecture 300 in accordance with implementations of the present disclosure. In the example of FIG. 3, the example transition architecture 300 includes a legacy system 302 (e.g., LaMa v3.x on AS-Java) that leverages a set of external services (microservices) 304. The legacy system 302 includes a legacy core 306, a transition service broker 308, and a service proxy 310. The legacy core includes a set of legacy core components 312 with respective service facades 314, and a service proxy 316. In some examples, and as described herein, the transition architecture 300 enables a transition strategy that includes porting of a minimal set of components that form a functional solution that can be offered to end-users (e.g., customer enterprises).

In accordance with implementations of the present disclosure, the transition service broker 308 injects a distributed, service-based architecture into the legacy system 302 (e.g, monolithic application). More particularly, the transition service broker 308 enables the core components 312 of the legacy system 302 to consume functionality of the set of services 304 through their respective service facades 314.

As described in further detail herein, each service facade 314 (also referred to as microservice facade) is a mapper from environment APIs to microservice APIs. In some examples, registration of external services 304 are configured by users of the system. This is because access to the external services 304 cannot be derived from the system internals, and include network and connection parameters as well as access credentials that enable connection to the external services 304. In view of this, setup and update procedures include entering the external service connection parameters for external services 304 requiring this. In some examples, the UI or application ingesting the connection parameters calls a registry service through a service registry facade, described in further detail herein.

Figures 4A, 4B:
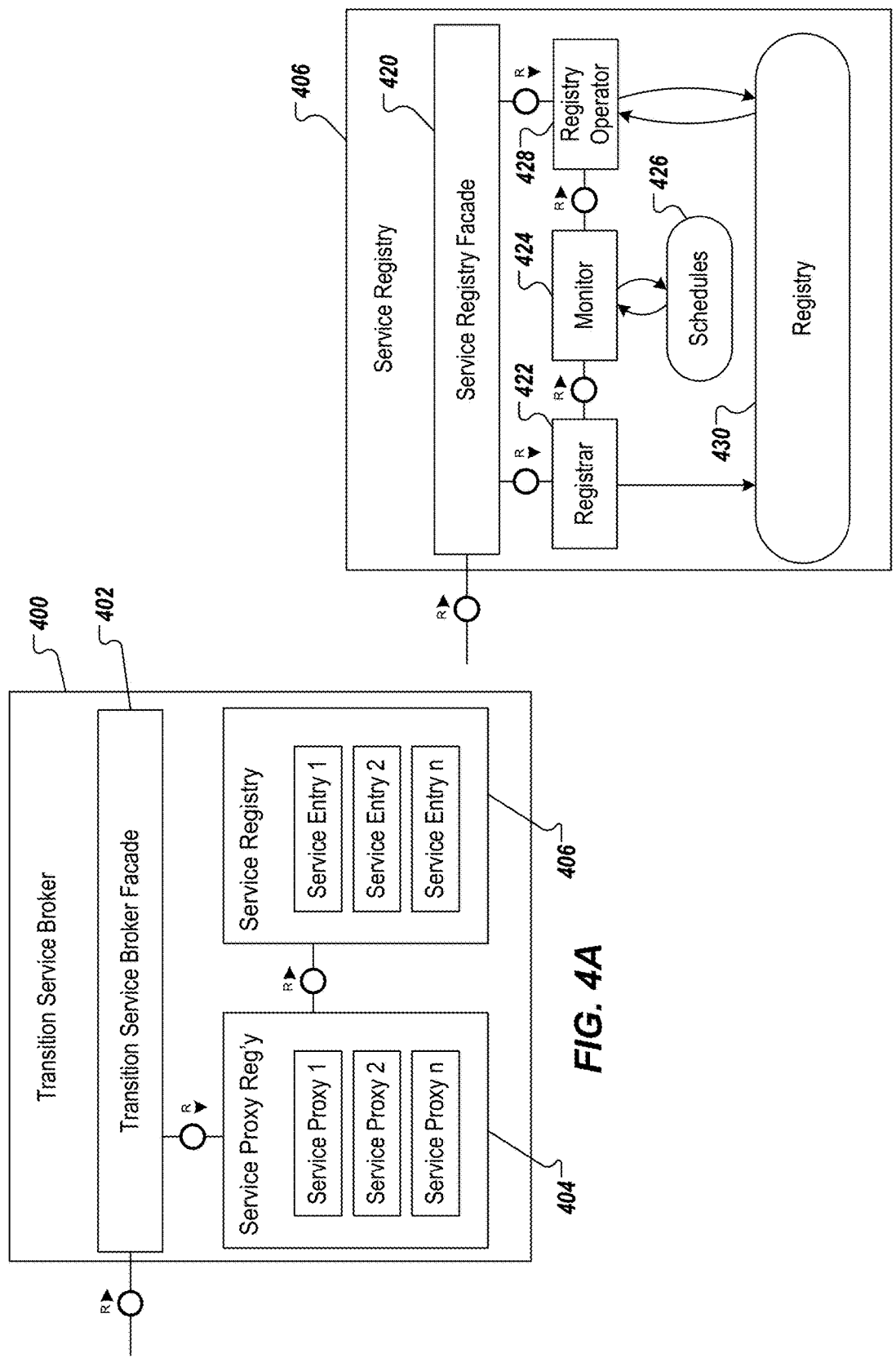
FIG. 4A depicts an example transition service broker in accordance with implementations of the present disclosure.
FIG. 4B depicts an example service registry in accordance with implementations of the present disclosure.

FIG. 4A depicts an example transition service broker 400 (e.g., the transition service broker 308 of FIG. 3) in accordance with implementations of the present disclosure. In the example of FIG. 4A, the example transition service broker 400 includes a transition service broker facade 402, a service proxy registry 404, and a service registry 406. The service proxy registry 404 provides a registry of respective service proxies (e.g., the service proxies 310, 316 of FIG. 3). The service registry 406 provides a registry of services (e.g., the services 304 of FIG. 3) that are available for consumption by the legacy system (e.g., the core components 312 of the legacy system 302 of FIG. 3).

In accordance with implementations of the present disclosure, the transition service broker 400 extends the monolithic architecture of the legacy system (e.g., the legacy system 302 of FIG. 3) with multiple features. Example features include, without limitation: registration, monitoring and integration of external services; registration of internal (legacy) components as a service (e.g., core components 312 of FIG. 3); provision of a single interface (e.g., the service proxies 310, 316) for external services, and internal legacy components; and simulation of a service-based environment by providing configurable latencies, outages and communication protocols through service proxy classes.

In some implementations, the service proxy registry 404 provides a lookup mechanism for service proxies (e.g., service proxy classes) that provide a protocol-independent, callable interface to deployed services. The service proxies (e.g., the service proxies 310, 316 of FIG. 3) are utilized by the internal legacy components (e.g., the core components 312 of FIG. 3), and external services (e.g., the services 304 of FIG. 3) for service-to-service communication. In some examples, a one-to-one, or a many-to-one mapping can be provided between a registered external service, or internal legacy component to a dedicated service proxy. In some examples, the communication protocol between a service proxy, and a mapped (external) service depends on the interface provided by the service (e.g., REST, SOAP). In some examples, service proxies that are mapped to internal components, and interfaces can use direct method calls to minimize latency. In some examples, a service proxy can provide a fail early (short circuit pattern) behavior by utilizing service health information provided by the service registry 406.

FIG. 4B depicts the example service registry 406 of FIG. 4A in accordance with implementations of the present disclosure. The example service registry 406 includes a service registry facade 420, a registrar 422, a monitor 424, schedules 426, a registry operator 428, and a registry 430.

In some examples, the service registry facade 420 provides a common interface for registry services described herein. In some examples, the registrar 422 registers, or deletes services. In some examples, the monitor executes service health checks, based on health check schedules 426, and updates the status of respective services through the registry operator 428. In some examples, the registry operator 328 executes operations on the registry 430 (e.g., status updates, service lookups). In some examples, the registry stores metadata of registered services.

In further detail, internal services are spun-up based on the basic configuration of the underlying product. In some examples, the configuration is provided in a file, or a configuration table, and can be described as representing a service bill-of-material. The initialization routine of the systems creates the services. The service instances contact the service registry 430 through the transition service broker facade 402 (e.g., API) that in turn calls the service registry facade 420 (e.g., API), and registers itself (e.g., with name and address). The transition service broker facade 402, and the service registry facade 420 can each be generally referred to as service APIs.

In accordance with implementations of the present disclosure, the service registry 406 provides service registration, lookup and health checking for the legacy core (e.g., the legacy core 306 of FIG. 3). In some implementations, the service registry enables the legacy core to consume external services, and internal functionality in the same service-oriented manner to enable the transition from a monolithic core to a distributed service-based architecture, as described herein.

In accordance with implementations of the present disclosure, the transition from the monolithic architecture to the service-based architecture is divided into multiple phases. In some examples, the phases are dictated by the anticipated development roadmap for the particular platform (e.g., LaMa), the current on-premise model, and a new cloud deployment and operation model. In some examples, the development roadmap, on-premise shipment and delivery, and the cloud deployment and operation model can be viewed as layers that functionally depend on each other. In some examples, the transition period mandates refactoring activities for existing functionality (or rules for new functionality). This can include, for example, and without limitation, code being partitioned into a runtime-independent core, and a runtime-dependent facade. As described herein, the facade encapsulates all necessary application server (e.g., AS-Java) dependencies, and maps them to independent code. Example phases can include, without limitation, a decomposition phase, a transition to continuous delivery model phase, a porting and development phase, and a product subset and ramp-up phase.

In some implementations, the decomposition phase can be considered as a preparation phase for porting code that is dependent on the application server (e.g., Netweaver AS-Java) to another runtime. In some examples, porting the codebase of the legacy application to the new platform is a step-by-step approach. For example, to decompose the monolithic application (e.g., LaMa application), functional dependent components (bounded contexts), and component borders and their interfaces must be determined. After this assessment, necessary refactoring and rewriting is performed to achieve a well-structured and componentized base structure. In some examples, any new functionality will be implemented as microservice or self-contained component with dedicated domain model and interface. Accordingly, steps of the decomposition phase can include, without limitation, identify component boundaries (bounded contexts), removing inter-component dependencies, and reorganizing source code in independent development components.

In some implementations, the transition to continuous delivery model phase generally includes setup, configuration, and establishment of an alternative development environment. Example steps can include, without limitation, setup and configuration of a code repository (e.g., Git repository), setup and configuration of an automated build (e.g., Jenkins), establish build processes, create automated unit and integration tests, and setup and configure potential deployment environments.

In some implementations, the porting and development phase includes the actual porting as starting point for the next generation platform (e.g., LaMaNG). This includes, for example, and without limitation, porting and refactoring of application server components (e.g., Netweaver AS-Java development components (DCs)), in hand with the development of new components. Example steps can include, without limitation, abstracting interface layers (e.g., dependent on the application server) using facades, replacing proprietary frameworks and libraries, and refactoring and porting DC code to new runtimes.

In some implementations, the product sunset and ramp-up phase can be described as the final phase before general availability of the next generation platform (e.g., LaMaNG). In some examples, this includes deployment of all mandatory services of a minimal viable product release of the next generation platform, fully operational development operations, accounting and billing. In parallel, with beginning of the next generation platform ramp-up, sunsetting of the legacy platform can be started. In some examples, there will be no further feature development and maintenance for the legacy platform.

In some implementations, the transition service broker exhibits additional features that support the transition from a monolithic application to a microservice-based architecture. In some examples, the additional features support testing of product, while the product is on the transition path to ensure the existence and quality of certain microservice characteristics. Example additional features of the transition service broker include, without limitation, a state recovery manager, an additional connection manager, a performance monitor, and a message broker.

In some implementations, the state recovery manager randomly deletes existing service instances, starts a new instance, and checks whether the state was fully recovered by analyzing the service logs for errors. The absence of error messages assumes a successful recovery. In this manner, the state recovery manager ensures that the microservice is completely stateless, and the application state is stored at the database. This also increases the resilience of all other services, which react to the absence of a service. In some examples, the state recovery manager implicitly checks for the isolation of the services, because the absence of a service would then lead to inconsistencies in other services.

In some examples, the monolithic application does not support multi-tenancy, while the target architecture (microservices-based architecture) supports multi-tenancy. In view of this, the additional connection manager checks for multi-tenancy. In some examples, the additional connection manager switches the database connection to another tenant (technically the tenant schema) during runtime (i.e. without restarting the system and keeping the service instances as if the system was operated with multiple tenants). A specific set of tests is executed using different connections in order to ensure that multiple tenants can be supported, and that each tenant is isolated with respect to other tenants. In some examples, the additional connection manage provides application router functionality to enable mapping the service address (e.g., including the tenant ID) to the actual service instance running inside the system. In some examples, the additional connection manager signals to the service instances that the addresses of the service proxies have changed (to the new tenant) (and providing the new address), change the addresses of the services in the service registry and service proxies.

In some implementations, the performance monitor leverages performance instrumentation that is implemented in the service proxies. In some examples, the performance instrumentation measures the inter-service calls (e.g., message size of the calls, number of calls, duration of calls). The performance monitor gathers the metrics from the service proxies, and creates statistics about the traffic to/from the respective services. In some examples, the statistics are used to detect bottlenecks and review the cut of the services. Large message sizes, long durations and high number of calls suggest either a performance bottleneck, or even a wrong cut of the services.

In some implementations, microservice architectures use asynchronous instead of synchronous communication. In view of this, the message broker is provided, which interacts with the service proxies send/receive messages.

One goal of the transition platform of the present disclosure is that the transition (re-platforming) from the monolithic application (e.g., LaMa) to the microservices-based architecture (e.g., LaMa NG) occurs as smoothly as possible. One of the critical aspects is that the future services are autonomous. In other words, there are no dependencies to other services, or the still monolithic functionality. Unfortunately, the monolithic platform still allows for these dependencies. Such dependencies, however, would not break the system execution. Consequently, the dependencies would not be seen during testing, and would only be recognized if the porting to the microservice platform is actually carried out after the transition phase. This is too late.

In view of this, implementations of the present disclosure provide a package isolation manager. In some examples, the package isolation manager ensures that the new services are isolated from each other, and from the still existing monolithic functionality. For example, for a new service that is to be introduced (e.g., during the transition (re-platforming), the service developer creates a service model. In some examples, the service model includes a list of service packages (e.g., the names of AS Java development components and their path in the code base), a list of service proxy classes and service facade classes for the service, and a list of database tables and authorization roles for the service. In some implementations, the package isolation manager reads the list of service packages from the service model, and analyses the package structure (e.g., scans the meta data). In some examples, the package isolation manager checks that the visibility of the components is private and only the proxy is visible as the public interface of the service. An error is reported in case that unsolicited non-private components are found.

In some examples, the package isolation manager reads the list of database tables and authorization roles from the service model, and performs multiple checks. A first check includes determining whether there is an overlap between the lists of tables of any two services. A second check includes determining whether the authorization role of the service is exactly the set of tables of the service. An error is reported in case that inconsistencies are found.

Accordingly, the package isolation manager enables restricting of access to the microservice interface only, partitioning of existing coding into microservices with each one having their own persistency and clear set of components, and implementation of a service interface that is solely used to access the set of components of the microservice. In some examples, the package isolation manager has a remote API that can be used to integrate the package isolation manager into a build process, and being called by the build process infrastructure. Errors from the package isolation manager enables aborting of the build process, if needed. In some implementations, instead of only conducting checks, the package isolation manager can change the code base according to the service model. For example, the package isolation manager can set the visibility of components within a package according to the service model, create the authorization profile based on the list of tables, and provide an editor for editing of the service model.

Figure 5:
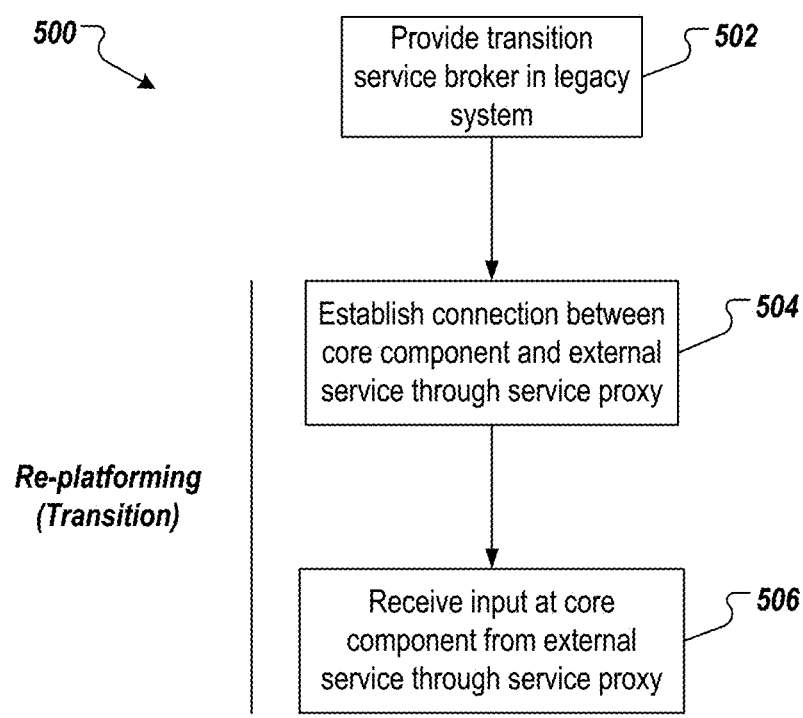
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices. For example, the example process 500 can be executed for re-platforming of a software product from a legacy architecture to a microservices-based architecture.

A legacy system of the legacy architecture (e.g., monolithic application executing on an application server) is provided with a transition service broker (502). For example, and as described with reference to FIG. 3, the transition service broker 308 is provided in the legacy system 302. In some implementations, the transition service broker 308 includes a service proxy registry (e.g., the service proxy registry 404 of FIG. 4A), and a service registry (e.g., the service registry 406). In some examples, the service proxy registry registers service proxies, each service proxy enabling interaction between at least one core component (e.g., the core components 312 of FIG. 3) of a legacy core (e.g., the legacy core 306), and one or more external services (e.g., the external services 304). In some examples, the service registry registers services available for consumption by core components of the legacy core. During a transition period between the legacy architecture, and the microservices-based architecture, a connection is established between at least one core component, and an external service through a service proxy (504), and input is received from the external service through the connection (506). In some examples, the input is processed by the at least one core component during execution of the software product in the legacy architecture.

Figure 6:
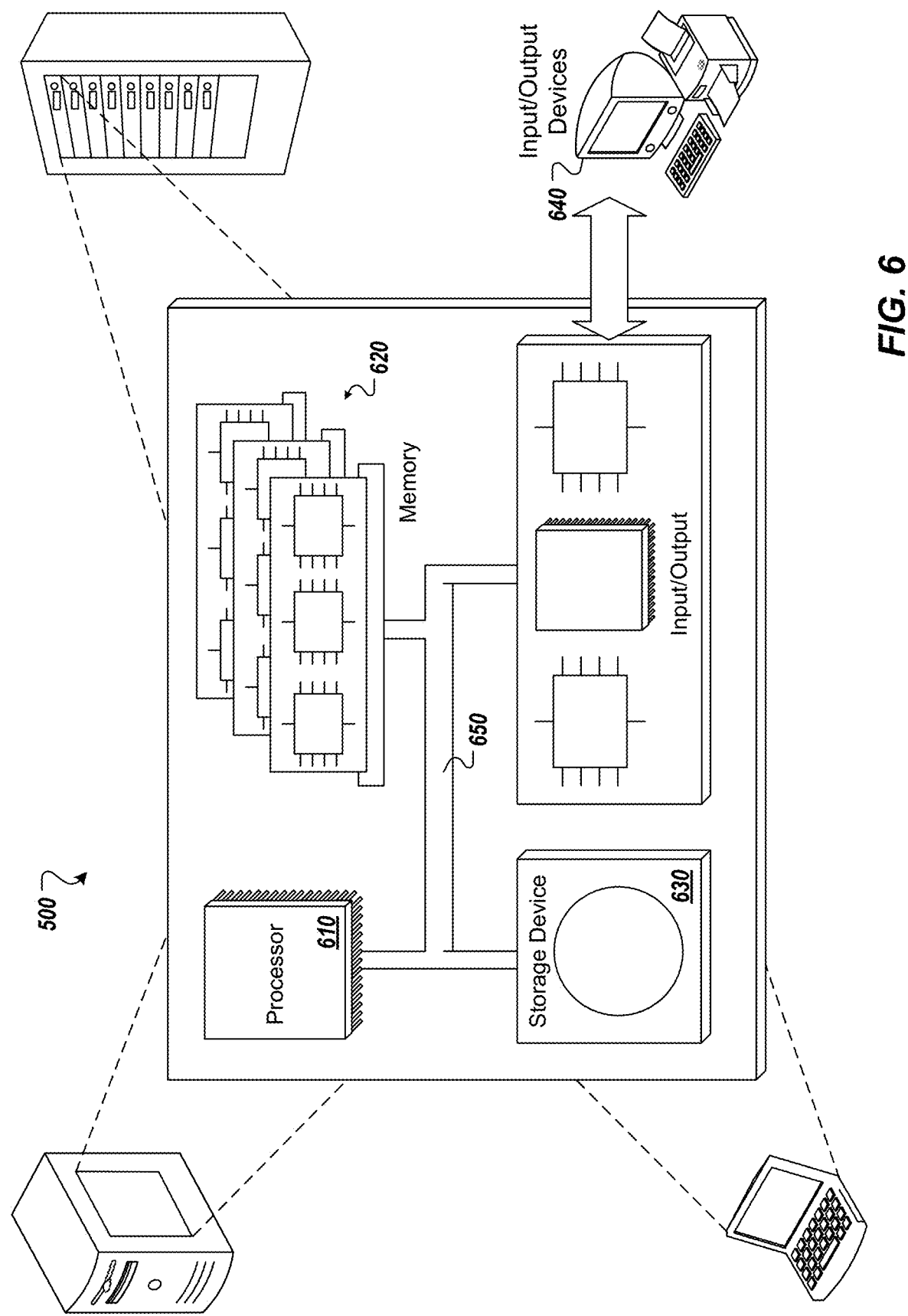
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for re-platforming a software product from a legacy architecture to a microservices-based architecture, the method being executed by one or more processors and comprising:
    providing, within a legacy system of the legacy architecture, a transition service broker, the transition service broker comprising a service proxy registry, and a service registry, the service proxy registry registering service proxies, each service proxy enabling interaction between at least one core component of a legacy core, and one or more external services, the service registry registering services available for consumption by core components of the legacy core, each external service of the one or more external services comprising a service facade that maps between the legacy architecture, and the service;
    during a transition period between the legacy architecture, and the microservices-based architecture:
    establishing a connection between the at least one core component, and an external service through a service proxy, and
    receiving input from the external service through the connection, the input being processed by the at least one core component during execution of the software product in the legacy architecture.

2. The method of claim 1, wherein the transition service broker comprises a package isolation manager that assigns an existing package to a service as an assigned package, and changes a visibility of the assigned package to restrict access to the assigned package to an interface of the service.

3. The method of claim 1, wherein the service broker comprises a state recovery manager that is configured to delete a service instance that is existing and includes a state, and is further configured to restart the service instance, and determine whether the state was fully recovered after restart.

4. The method of claim 1, wherein the transition service broker comprises a facade for communication between core components of the legacy core, and the service proxy registry.

5. The method of claim 1, wherein the service proxy registry provides a lookup mechanism for service proxies that provide a protocol-independent, callable interface to external services.

6. The method of claim 1, wherein the transition service broker registers, monitors and integrates the external services for consumption by the legacy core during the transition, and registers one or more components as services to be consumed by one or more other core components during the transition.

7. The method of claim 1, wherein the service registry periodically performs status checks on registered services, and stores status of the registered services.

8. A non-transitory computer-readable storage medium coupled to one or more processors and having instructions stored thereon which, when executed by the one or more processors, cause the one or more processors to perform operations for replatforming a software product from a legacy architecture to a microservices-based architecture, the operations comprising:
    providing, within a legacy system of the legacy architecture, a transition service broker, the transition service broker comprising a service proxy registry, and a service registry, the service proxy registry registering service proxies, each service proxy enabling interaction between at least one core component of a legacy core, and one or more external services, the service registry registering services available for consumption by core components of the legacy core, each external service of the one or more external services comprising a service facade that maps between the legacy architecture, and the service;
    during a transition period between the legacy architecture, and the microservices-based architecture:
    establishing a connection between the at least one core component, and an external service through a service proxy, and
    receiving input from the external service through the connection, the input being processed by the at least one core component during execution of the software product in the legacy architecture.

9. The computer-readable storage medium of claim 8, wherein the transition service broker comprises a package isolation manager that assigns an existing package to a service as an assigned package, and changes a visibility of the assigned package to restrict access to the assigned package to an interface of the service.

10. The computer-readable storage medium of claim 8, wherein the service broker comprises a state recovery manager that is configured to delete a service instance that is existing and includes a state, and is further configured to restart the service instance, and determine whether the state was fully recovered after restart.

11. The computer-readable storage medium of claim 8, wherein the transition service broker comprises a facade for communication between core components of the legacy core, and the service proxy registry.

12. The computer-readable storage medium of claim 8, wherein the service proxy registry provides a lookup mechanism for service proxies that provide a protocol-independent, callable interface to external services.

13. The computer-readable storage medium of claim 8, wherein the transition service broker registers, monitors and integrates the external services for consumption by the legacy core during the transition, and registers one or more components as services to be consumed by one or more other core components during the transition.

14. The computer-readable storage medium of claim 8, wherein the service registry periodically performs status checks on registered services, and stores status of the registered services.

15. A system, comprising:
    a computing device; and
    a computer-readable storage device coupled to the computing device and having instructions stored thereon which, when executed by the computing device, cause the computing device to perform operations for re-platforming a software product from a legacy architecture to a microservices-based architecture, the operations comprising:

providing, within a legacy system of the legacy architecture, a transition service broker, the transition service broker comprising a service proxy registry, and a service registry, the service proxy registry registering service proxies, each service proxy enabling interaction between at least one core component of a legacy core, and one or more external services, the service registry registering services available for consumption by core components of the legacy core, each external service of the one or more external services comprising a service facade that maps between the legacy architecture, and the service;

during a transition period between the legacy architecture, and the microservices-based architecture:

establishing a connection between the at least one core component, and an external service through a service proxy, and receiving input from the external service through the connection, the input being processed by the at least one core component during execution of the software product in the legacy architecture.

16. The system of claim 15, wherein the transition service broker comprises a package isolation manager that assigns an existing package to a service as an assigned package, and changes a visibility of the assigned package to restrict access to the assigned package to an interface of the service.

17. The system of claim 15, wherein the service broker comprises a state recovery manager that is configured to delete a service instance that is existing and includes a state, and is further configured to restart the service instance, and determine whether the state was fully recovered after restart.

18. The system of claim 15, wherein the transition service broker comprises a facade for communication between core components of the legacy core, and the service proxy registry.

19. The system of claim 15, wherein the service proxy registry provides a lookup mechanism for service proxies that provide a protocol-independent, callable interface to external services.

20. The system of claim 15, wherein the transition service broker registers, monitors and integrates the external services for consumption by the legacy core during the transition, and registers one or more components as services to be consumed by one or more other core components during the transition.

* * * * *